US009140162B2

(12) United States Patent
Bisaiji

(10) Patent No.: US 9,140,162 B2
(45) Date of Patent: *Sep. 22, 2015

(54) EXHAUST PURIFICATION SYSTEM OF INTERNAL COMBUSTION ENGINE

(75) Inventor: Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,230

(22) PCT Filed: Feb. 10, 2011

(86) PCT No.: PCT/JP2011/053429
§ 371 (c)(1),
(2), (4) Date: Oct. 13, 2011

(87) PCT Pub. No.: WO2012/108063
PCT Pub. Date: Aug. 16, 2012

(65) Prior Publication Data
US 2013/0323131 A1 Dec. 5, 2013

(51) Int. Cl.
*F01N 3/00* (2006.01)
*F01N 3/08* (2006.01)
(Continued)

(52) U.S. Cl.
CPC ............ *F01N 3/0892* (2013.01); *F01N 3/0842* (2013.01); *F01N 9/00* (2013.01);
(Continued)

(58) Field of Classification Search
USPC ............ 60/274, 285, 286, 295, 297, 301, 303
See application file for complete search history.

(56) References Cited

U.S. PATENT DOCUMENTS 5,052,178 A    10/1991    Clerc et al.
5,057,483 A    10/1991    Wan
(Continued)

FOREIGN PATENT DOCUMENTS

CN    101454081 A    6/2009
CN    101600860 A    12/2009
(Continued)

OTHER PUBLICATIONS

Mar. 15, 2011 International Search Report issued in International Application No. PCT/JP2011/053429.
(Continued)

*Primary Examiner* — Binh Q Tran
(74) *Attorney, Agent, or Firm* — Oliff PLC

(57) ABSTRACT

In an internal combustion engine, inside of an engine exhaust passage, a hydrocarbon feed valve (17), exhaust purification catalyst (13), and intermediate $NO_x$ adsorption catalyst (15) are arranged. The intermediate $NO_x$ adsorption catalyst (15) adsorbs nitrogen-containing intermediate and $NO_x$ which are exhausted from the exhaust purification catalyst (13). To make the nitrogen-containing intermediate or $NO_x$ which is adsorbed at the intermediate $NO_x$ adsorption catalyst (15) desorb from it, the concentration of hydrocarbons flowing into the exhaust purification catalyst (13) is made to vibrate within a predetermined range of amplitude of 200 ppm or more and within a predetermined range of period of 5 seconds or less, whereby $NO_x$ which is contained in exhaust gas is removed at the exhaust purification catalyst (13) while the heat of oxidation reaction of the hydrocarbons is used to make the intermediate $NO_x$ adsorption catalyst (15) rise in temperature.

11 Claims, 16 Drawing Sheets

(51) Int. Cl.
    *F01N 9/00*      (2006.01)
    *F02D 41/02*     (2006.01)
    *F01N 13/00*     (2010.01)
    *F02D 41/14*     (2006.01)

(52) U.S. Cl.
    CPC ........... *F01N 13/009* (2014.06); *F02D 41/025* (2013.01); *F02D 41/0275* (2013.01); *F01N 2240/30* (2013.01); *F01N 2430/06* (2013.01); *F01N 2610/03* (2013.01); *F02D 41/146* (2013.01); *F02D 41/1446* (2013.01); *Y02T 10/26* (2013.01); *Y02T 10/47* (2013.01)
    USPC .................. 60/297; 60/286; 60/301; 60/303

(56) References Cited

U.S. PATENT DOCUMENTS

| | | | |
|---|---|---|---|
| 5,075,274 | A | 12/1991 | Kiyohide et al. |
| 5,402,641 | A * | 4/1995 | Katoh et al. ............. 60/285 |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 * | 2/2005 | Elwart et al. ............. 60/285 |
| 6,877,311 | B2 | 4/2005 | Uchida |
| 6,983,589 | B2 | 1/2006 | Lewis, Jr. et al. |
| 7,063,642 | B1 | 6/2006 | Hu et al. |
| 7,073,325 | B2 | 7/2006 | Nakatani et al. |
| 7,082,753 | B2 | 8/2006 | Dalla Betta et al. |
| 7,111,456 | B2 * | 9/2006 | Yoshida et al. ............. 60/301 |
| 7,137,379 | B2 | 11/2006 | Sasaki et al. |
| 7,146,800 | B2 * | 12/2006 | Toshioka et al. ............. 60/285 |
| 7,165,393 | B2 | 1/2007 | Betta et al. |
| 7,299,625 | B2 * | 11/2007 | Uchida et al. ............. 60/277 |
| 7,332,135 | B2 | 2/2008 | Gandhi et al. |
| 7,412,823 | B2 | 8/2008 | Reuter et al. |
| 7,454,900 | B2 * | 11/2008 | Hayashi ............. 60/295 |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 * | 4/2010 | Asanuma et al. ............. 60/286 |
| 7,707,821 | B1 * | 5/2010 | Legare ............. 60/277 |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 * | 10/2012 | Handa et al. ............. 60/285 |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2002/0053202 | A1 | 5/2002 | Akama et al. |
| 2003/0010020 | A1 | 1/2003 | Taga et al. |
| 2003/0040432 | A1 | 2/2003 | Beall et al. |
| 2003/0101713 | A1 | 6/2003 | Dalla Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter et al. |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Anderson et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | A-2004-316458 | 11/2004 |
| EP | 1 519 015 A2 | 3/2005 |
| EP | 1544429 A1 | 6/2005 |
| EP | 1 710 407 A1 | 10/2006 |
| EP | 1 793 099 A1 | 6/2007 |
| EP | 1 911 506 | 4/2008 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 A1 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |

(56) References Cited

FOREIGN PATENT DOCUMENTS

| | | |
|---|---|---|
| JP | A-H09-220440 | 8/1997 |
| JP | A-11-30117 | 2/1999 |
| JP | A-11-62559 | 3/1999 |
| JP | A-11-081994 | 3/1999 |
| JP | A-2000-257419 | 9/2000 |
| JP | A-2002-188429 | 7/2002 |
| JP | A-2004-16850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-64167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-2451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

May 15, 2013 Office Action issued in U.S. Appl. No. 13/202,694.
Office Action dated Jul. 24, 2013 issued in U.S. Appl. No. 13/202,692.
U.S. Appl. No. 13/202,733, filed Sep. 30, 2011 in the name of Bisaiji et al.
International Search Report dated Jun. 15, 2010 issued in PCT/JP2010/054730 (with translation).
Written Opinion for PCT Application No. PCT/JP2010/065186 mailed Nov. 22, 2010.
International Search Report for PCT Application No. PCT/JP2010/065186 mailed Nov. 22, 2010.
Nov. 22, 2010 International Search Report issued in International Patent Application No. PCT/JP2010/065187.
Oct. 26, 2012 Office Action issued in U.S. Appl. No. 13/202,692.
Nov. 26, 2012 Office Action issued in U.S. Appl. No. 13/202,694.
U.S. Appl. No. 13/202,694 in the name of Bisaiji et al. filed Sep. 19, 2011.
U.S. Appl. No. 13/202,692 in the name of Umemoto et al. filed Sep. 20, 2011.
U.S. Appl. No. 13/262,858 in the name of Bisaiji et al. filed Oct. 4, 2011.
Corrected Notice of Allowability dated Feb. 6, 2014 issued in U.S. Appl. No. 13/202,694.
Office Action dated Jun. 23, 2014 issued in U.S. Appl. No. 13/262,858.
Office Action dated Aug. 8, 2013 issued in U.S. Appl. No. 13/258,483.
Office Action dated Jun. 16, 2014 issued in U.S. Appl. No. 13/581,186.
Office Action dated Jun. 18, 2014 issued in U.S. Appl. No. 13/582,909.
International Search Report dated Jun. 21, 2011 issued in International Patent Application No. PCT/JP2011/059880 (with English translation).
International Search Report dated Mar. 22, 2011 issued in International Patent Application No. PCT/JP2010/073645 (with translation).
International Search Report dated May 17, 2011 issued in International Patent Application No. PCT/JP2011/057264 (with translation).
U.S. Appl. No. 13/578,148 in the name of Umemoto et al., filed Aug. 9, 2012.
U.S. Appl. No. 13/581,186 in the name of Kazuhiro Umemoto et al., filed Aug. 24, 2012.
U.S. Appl. No. 13/582,909 in the name of Kazuhiro Umemoto et al., filed Sep. 5, 2012.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,506, filed Sep. 30, 2011, in the name of Bisaiji et al.
U.S. Appl. No. 13/499,211, filed Mar. 29, 2012, in the name of Bisaiji et al.
U.S. Appl. No. 13/502,210, filed Apr. 16, 2012, in the name of Bisaiji.
U.S. Appl. No. 13/934,080 in the name of Bisaiji et al., filed Jul. 2, 2013.
U.S. Appl. No. 13/255,710 in the name of Bisaiji et al., filed Oct. 12, 2011.
U.S. Appl. No. 13/255,774 in the name of Bisaiji et al., filed Sep. 22, 2011.
Notice of Allowance dated Nov. 27, 2013 issued in U.S. Appl. No. 13/258,483.
Notice of Allowance dated Oct. 4, 2013 issued in U.S. Appl. No. 13/259,885.
International Search Report dated Jun. 15, 2010 issued in PCT/JP2010/054740 (with translation).
Written Opinion dated Jun. 15, 2010 issued in PCT/JP2010/054740 (with translation).
Search Report dated Jun. 20, 2012 issued in European Patent Application No. 10845966.0.
International Search Report dated Jun. 15, 2010 issued in International Patent Application No. PCT/JP2010/054731 (with translation).
International Search Report dated Jun. 29, 2010 issued in International Patent Application No. PCT/JP2010/056345.
Office Action dated Apr. 24, 2013 issued in U.S. Appl. No. 13/255,710.
Office Action dated Oct. 24, 2013 issued in U.S. Appl. No. 13/255,710.
Office Action dated Jan. 17, 2013 issued in U.S. Appl. No. 13/202,733.

(56) References Cited

OTHER PUBLICATIONS

International Search Report dated Jun. 15, 2010 issued in International Application No. PCT/JP2010/054729.
International Search Report dated Sep. 13, 2011 issued in International Application No. PCT/JP2011/066628 (with Translation).
Office Action dated Jan. 22, 2014 issued in U.S. Appl. No. 13/499,211.
Office Action dated May 27, 2014 issued in U.S. Appl. No. 13/255,710.
Notice of Allowance dated Sep. 18, 2014 issued in U.S. Appl. No. 13/255,710.
Office Action dated Oct. 2, 2014 issued in U.S. Appl. No. 13/582,862.
Notice of Allowance dated Jul. 9, 2013 issued in U.S. Appl. No. 13/255,774.
Notice of Allowance dated Dec. 9, 2013 issued in U.S. Appl. No. 13/262,506.
Notice of Allowance dated Dec. 27, 2013 issued in U.S. Appl. No. 13/502,210.
Office Action dated Jul. 14, 2014 issued in U.S. Appl. No. 13/264,884.
Office Action dated Jul. 14, 2014 issued in U.S. Appl. No. 13/262,001.
Notice of Allowance dated Oct. 17, 2013 issued in U.S. Appl. No. 13/202,694.
Office Action dated Oct. 23, 2013 issued in U.S. Appl. No. 13/263,272.
Office Action dated Apr. 23, 2014 issued in U.S. Appl. No. 13/260,986.
Notice of Allowance dated Mar. 4, 2014 issued in U.S. Appl. No. 13/255,786.
Office Action dated May 8, 2014 issued in U.S. Appl. No. 13/375,674.
Office Action dated May 2, 2014 issued in U.S. Appl. No. 13/263,660.
Notice of Allowance dated Nov. 13, 2013 issued in U.S. Appl. No. 13/202,692.
Office Action dated May 7, 2014 issued in U.S. Appl. No. 13/264,062
Notice of Allowance dated Mar. 28, 2014 issued in U.S. Appl. No. 13/582,862.
Jun. 19, 2014 Office Action issued in U.S. Appl. No. 13/264,594.
Oct. 26, 2010 International Search Report issued in International Patent Application No. PCT/JP2010/063135.
Jan. 18, 2011 International Search Report issued in International Patent Application No. PCT/JP2010/068785.
Jan. 18, 2011 International Search Report issued in International Patent Application No. PCT/JP2010/067707.
Dec. 21, 2010 Search Report issued in International Patent Application No. PCT/JP2010/065449 (with translation).
Jan. 18, 2011 International Search Report issued in International Patent Application No. PCT/JP2010/067705.
Mar. 8, 2011 International Search Report issued in International Application No. PCT/JP2011/052969 (with translation).
Mar. 22, 2011 International Search Report issued in International Patent Application No. PCT/JP2010/072299.
International Search Report issued in International Patent Application No. PCT/JP2011/075618 dated Dec. 27, 2011.
Written Opinion issued in International Patent Application No. PCT/JP2011/075618 dated Dec. 27, 2011.
International Search Report dated Jun. 29, 2010 in International Application No. PCT/JP2010/055303.
U.S. Appl. No. 13/259,574 in the name of Tsukamoto et al. filed Sep. 23, 2011.
U.S. Appl. No. 13/260,986 in the name of Watanabe et al. filed Sep. 29, 2011.
U.S. Appl. No. 13/263,272 in the name of Bisaiji et al. filed Oct. 6, 2011.
U.S. Appl. No. 13/263,660 in the name of Umemoto et al. filed Oct. 7, 2011.
U.S. Appl. No. 13/264,062 in the name of Watanabe et al. filed Oct. 12, 2011.
U.S. Appl. No. 13/264,594 in the name of Inoue et al. filed Oct. 14, 2011.
U.S. Appl. No. 13/375,674 in the name of Inoue et al. filed Dec.1, 2011.
U.S. Appl. No. 13/580,000 in the name of Bisaiji et al. filed Aug. 20, 2012.
U.S. Appl. No. 13/582,862 in the name of Uenishi et al. filed Sep. 5, 2012.
U.S. Appl. No. 13/264,884 in the name of Bisaiji et al. filed Oct. 17, 2011.
U.S. Appl. No. 13/259,885 in the name of Umemoto et al. filed Sep. 23, 2011.
U.S. Appl. No. 13/258,483 in the name of Numata et al. filed Sep. 22, 2011.
U.S. Appl. No. 13/257,789 in the name of Nishioka et al. filed on Oct. 14, 2011.
Office Action dated Jul. 1, 2014 issued in U.S. Appl. No. 13/257,789.
Office Action dated Jun. 26, 2014 issued in U.S. Appl. No. 13/580,000.
Office Action dated Apr. 3, 2014 issued in U.S. Appl. No. 13/259,574.
U.S. Appl. No. 13/262,001 in the name of Inoue et al. filed Jan. 9, 2014.
Jun. 3, 2015 Office Action issued in U.S. Appl. No. 14/152,629.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which an exhaust purification catalyst for reacting $NO_x$ contained in exhaust gas and reformed hydrocarbons is arranged inside of an engine exhaust passage, a precious metal catalyst is carried on an exhaust gas flow surface of the exhaust purification catalyst and a basic exhaust gas flow surface part is formed around the precious metal catalysts, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, at the time of engine operation, to reduce the $NO_x$ which is contained in exhaust gas at the exhaust purification catalyst, the concentration of hydrocarbons flowing into the exhaust purification catalyst is made to vibrate within the predetermined range of amplitude and within the predetermined range of period, an intermediate $NO_x$ adsorption catalyst for adsorbing a nitrogen-containing intermediate or $NO_x$ which is produced in an $NO_x$ reduction process at this time and exhausted from the exhaust purification catalyst is arranged inside of the engine exhaust passage downstream of the exhaust purification catalyst, and, when desorbing the nitrogen-containing intermediate or $NO_x$ which is adsorbed at the intermediate $NO_x$ adsorption catalyst, the intermediate/$NO_x$ adsorption catalyst is made to rise in temperature by a heat of oxidation reaction of the hydrocarbons while vibrating the concentration of hydrocarbons flowing into the exhaust purification catalyst by within the above predetermined range of amplitude and within the above predetermined range of period.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
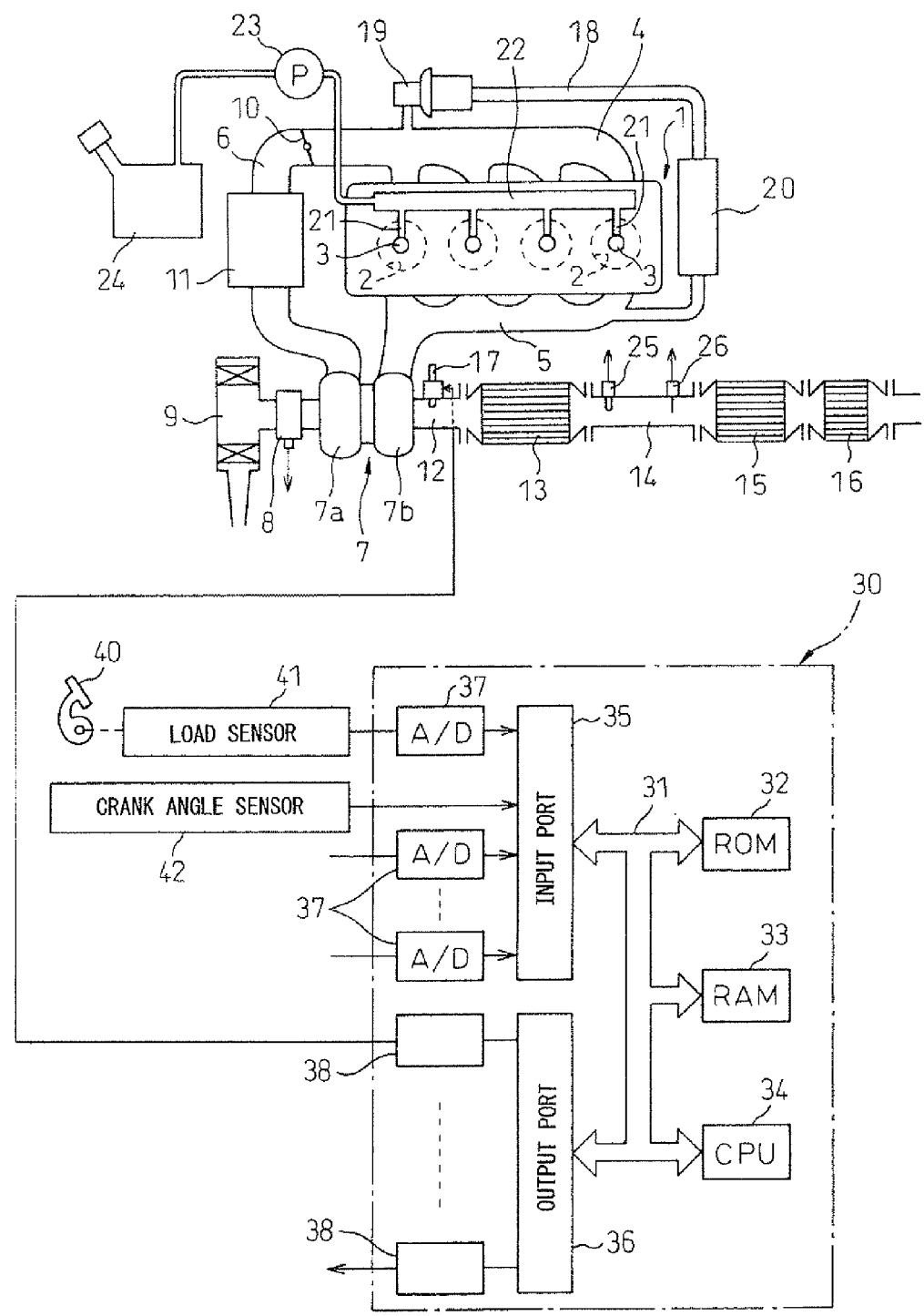
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected through an exhaust pipe 14 to an intermediate $NO_x$ adsorption catalyst 15 for adsorption of the nitrogen-containing intermediate or $NO_x$ which is exhausted from the exhaust purification catalyst 13. Further, an outlet of the intermediate $NO_x$ adsorption catalyst 15 is connected to a reduction catalyst 16. Inside the exhaust pipe 12 upstream of the exhaust purification catalyst 13, a hydrocarbon feed valve 17 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 17. Note that, the present invention can also be applied to a spark ignition type internal combustion engine in which fuel is burned under a lean air-fuel ratio. In this case, from the hydrocarbon feed valve 17, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 18. Inside the EGR passage 18, an electronically controlled EGR control valve 18 is arranged. Further, around the EGR passage 19, a cooling device 20 is arranged for cooling EGR gas flowing through the inside of the EGR passage 18. In the embodiment shown in FIG. 1, the engine cooling water is guided to the inside of the cooling device 20 where the engine cooling water is used to cool the EGR gas. On the other hand, each fuel injector 3 is connected through a fuel feed tube 21 to a common rail 22. This common rail 22 is connected through an electronically controlled variable discharge fuel pump 23 to a fuel tank 24. The fuel which is stored inside of the fuel tank 24 is fed by the fuel pump 23 to the inside of the common rail 22. The fuel which is fed to the inside of the common rail 22 is fed through each fuel feed tube 21 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13 inside of the exhaust pipe 14 are arranged an $NO_x$ concentration sensor 25 for detecting an $NO_x$ concentration in the exhaust gas which flows out from the exhaust purification catalyst 13 and a temperature sensor 26 for detecting an exhaust gas temperature. The output signals of these $NO_x$ concentration sensor 25, temperature sensor 26, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 17, EGR control valve 19, and fuel pump 23.

Figure 2:
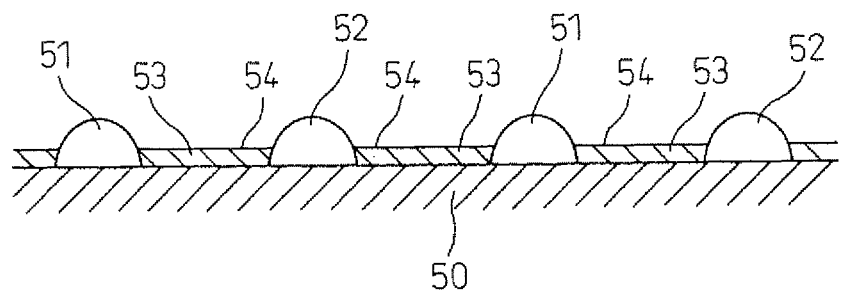
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
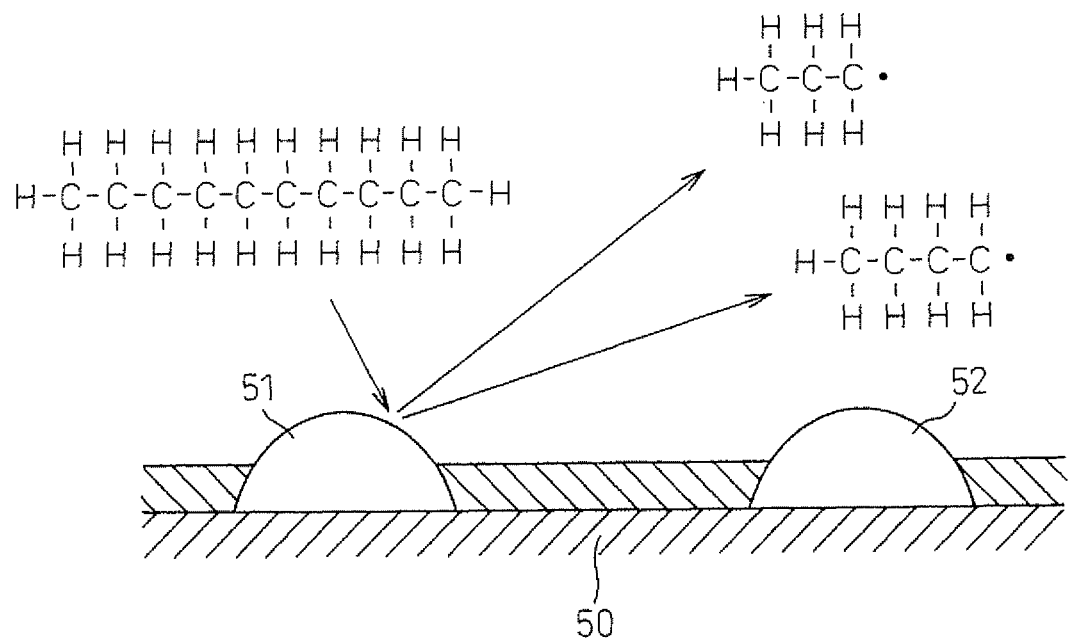
FIG. 3 is a view for explaining an oxidation reaction in an exhaust purification catalyst.

If hydrocarbons are injected from the hydrocarbon feed valve 17 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 17 become radical hydrocarbons HC with a small carbon number by the catalyst 51.

Note that, even if injecting fuel, that is, hydrocarbons, from the fuel injector 3 into the combustion chamber 2 during the latter half of the expansion stroke or during the exhaust stroke, the hydrocarbons are reformed inside of the combustion chamber 2 or at the exhaust purification catalyst 13, and the $NO_x$ which is contained in the exhaust gas is removed by the reformed hydrocarbons at the exhaust purification catalyst 13. Therefore, in the present invention, instead of feeding hydrocarbons from the hydrocarbon feed valve 17 to the inside of the engine exhaust passage, it is also possible to feed hydrocarbons into the combustion chamber 2 during the latter half of the expansion stroke or during the exhaust stroke. In this way, in the present invention, it is also possible to feed hydrocarbons to the inside of the combustion chamber 2, but below the present invention is explained taking as an example the case of injecting hydrocarbons from the hydrocarbon feed valve 17 to the inside of the engine exhaust passage.

Figure 4:
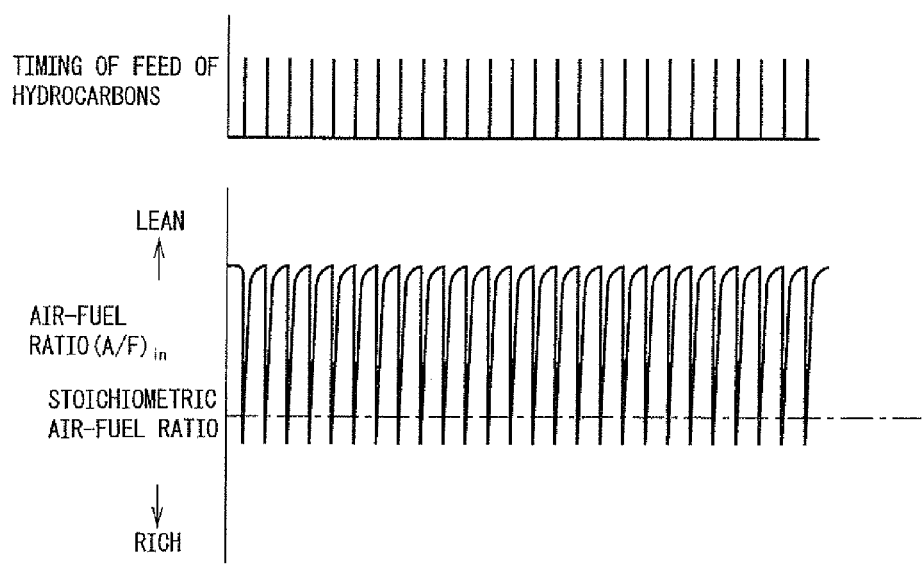
FIG. 4 is a view showing a change of an air-fuel ratio of exhaust gas flowing into an exhaust purification catalyst.

FIG. 4 shows the timing of feeding hydrocarbons from the hydrocarbon feed valve 17 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
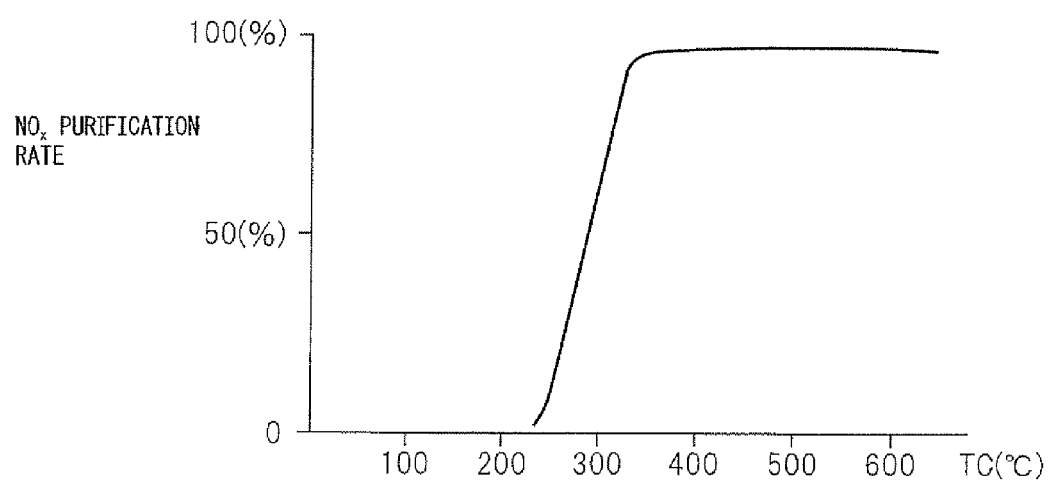
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
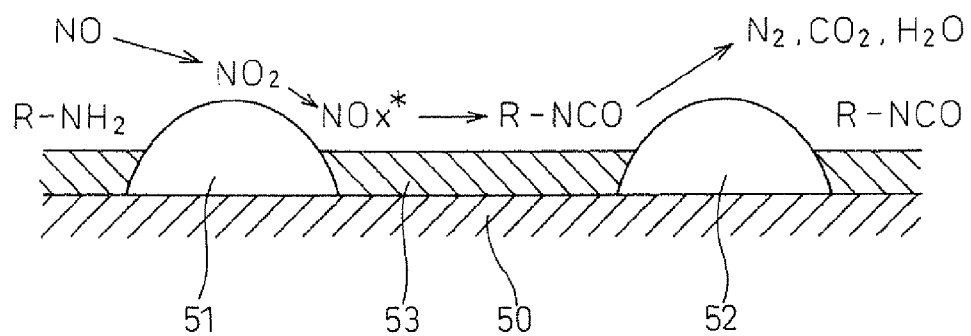
FIGS. 6A and 6B are views for explaining an oxidation reduction reaction in an exhaust purification catalyst.
Figure 6B:
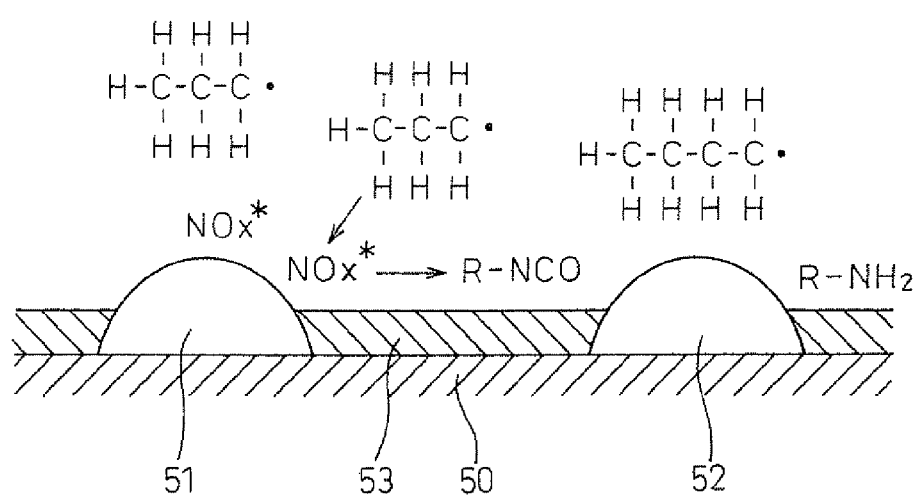

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 17 and the concentration of hydrocarbons flowing into the exhaust purification catalyst 13 becomes high.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 17, as shown in FIG. 3, the hydrocarbons are reformed and become radicalized inside of the exhaust purification catalyst 13. As a result, as shown in FIG. 6B, the hydrocarbon concentration around the active $NO_x^*$ becomes higher. In this regard, after the active $NO_x^*$ is produced, if the state of a high oxygen concentration around the active $NO_x^*$ continues for a predetermined time or more, the active $NO_x^*$ is oxidized and is absorbed in the basic layer 53 in the form of nitrate ions $NO_3^-$. However, if the hydrocarbon concentration around the active $NO_x^*$ is made higher before this predetermined time passes, as shown in FIG. 6B, the active $NO_x^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_x^*$ react. At this time, the active $NO_x^*$ reacts with the reducing intermediate R—NCO or R—$NH_2$ to become $N_2$, $CO_2$, $H_2O$, therefore the $NO_x$ is removed.

In this way, in the exhaust purification catalyst 13, by making the concentration of hydrocarbons flowing into the exhaust purification catalyst 13 higher, a reducing intermediate is produced. The concentration of hydrocarbons flowing into the exhaust purification catalyst 13 is lowered and the oxygen concentration is raised so that the active $NO_x^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x^*$. That is, it is necessary to make the concentration of hydrocarbons flowing into the exhaust purification catalyst 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 24, until the produced reducing intermediate reacts with the active $NO_x^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_x^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basic exhaust gas flow surface part 54, and the vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
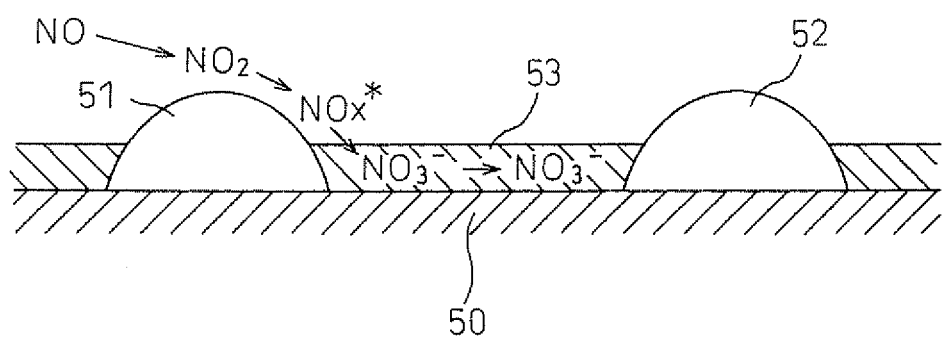
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_x^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
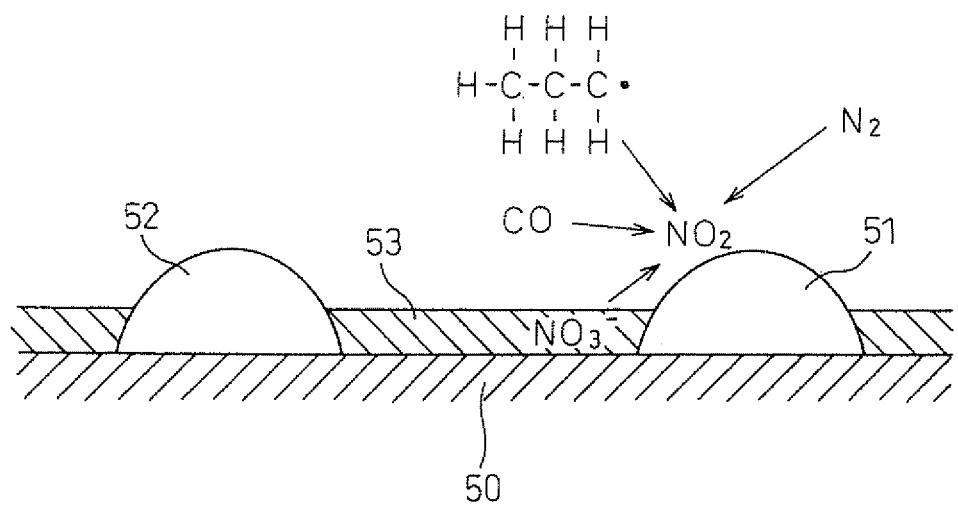

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 gradually become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
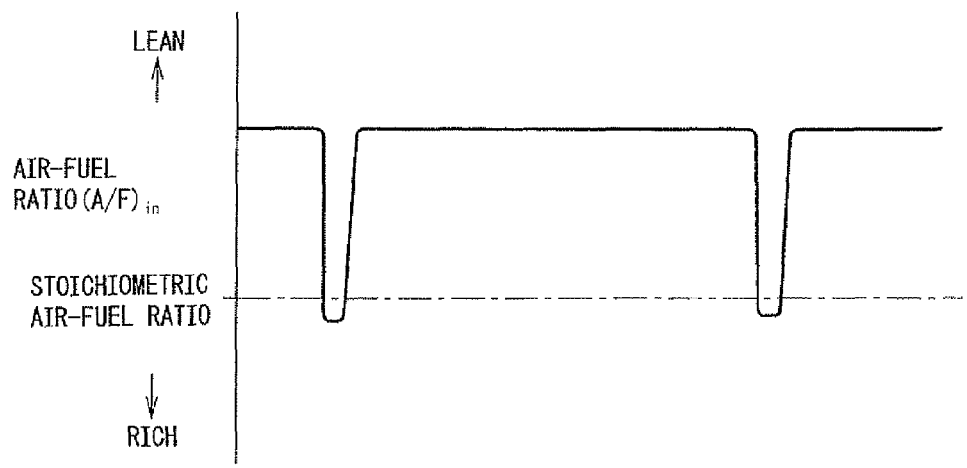
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
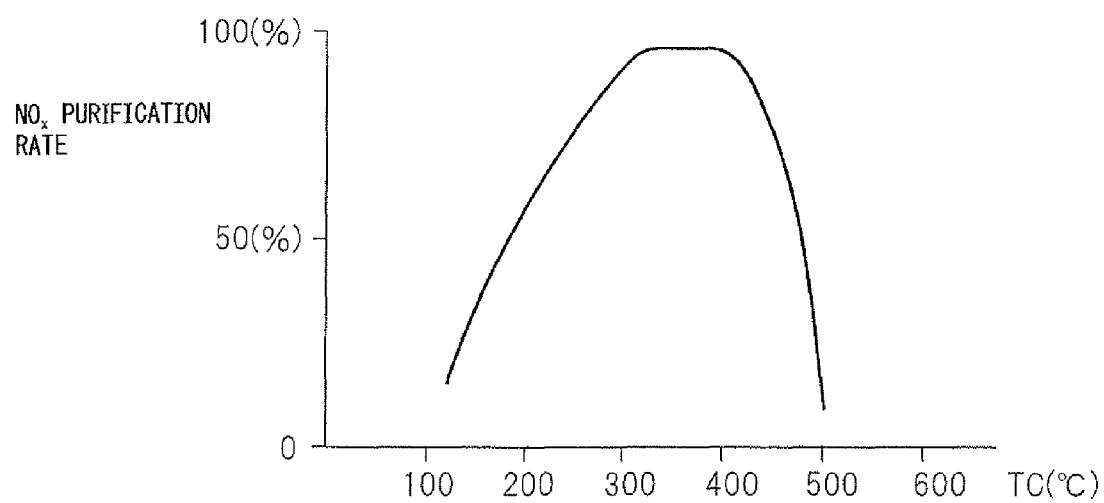
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 for reacting $NO_x$ contained in exhaust gas and reformed hydrocarbons is arranged inside of an engine exhaust passage, a precious metal catalyst 51, 52 is carried on the exhaust gas flow surface of the exhaust purification catalyst 13, and a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons flowing into the exhaust purification catalyst 13 is made to vibrate within a predetermined range of amplitude and within a predetermined range of period and has the property of being increased in storage amount of $NO_x$ which is contained in exhaust gas if the vibration period of the hydrocarbon concentration is made longer than the predetermined range, and, at the time of engine operation, the concentration of hydrocarbons flowing into the exhaust purification catalyst 13 is made to vibrate within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
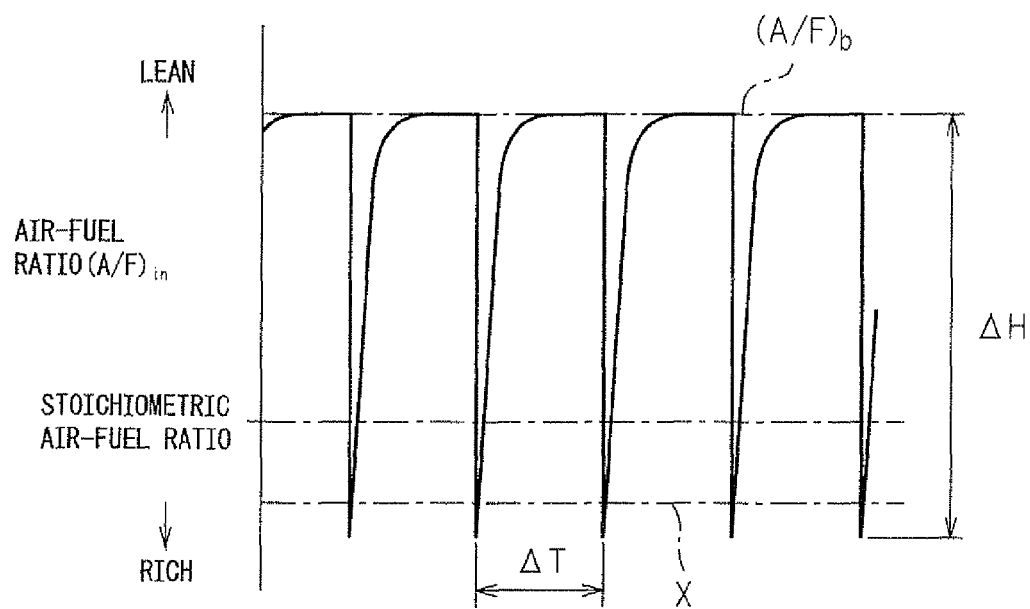
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HG which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediate without the produced active $NO_x^*$ being stored in the form of nitrates inside the basic layer 53 much at all. To make the active $NO_x^*$ and the reformed hydrocarbons react to produce a reducing intermediate, the air-fuel ratio (A/F)in has to be made lower than this upper limit X of the air-fuel ratio.

In other words, in FIG. 10, X shows the lower limit of the concentration of hydrocarbons required for making the active $NO_x^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x^*$, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
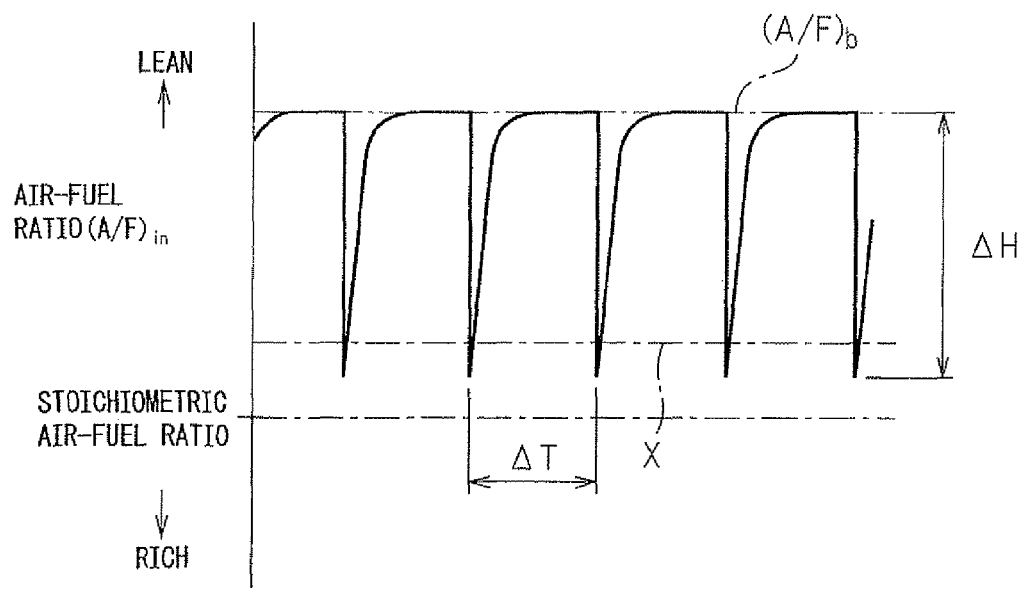
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
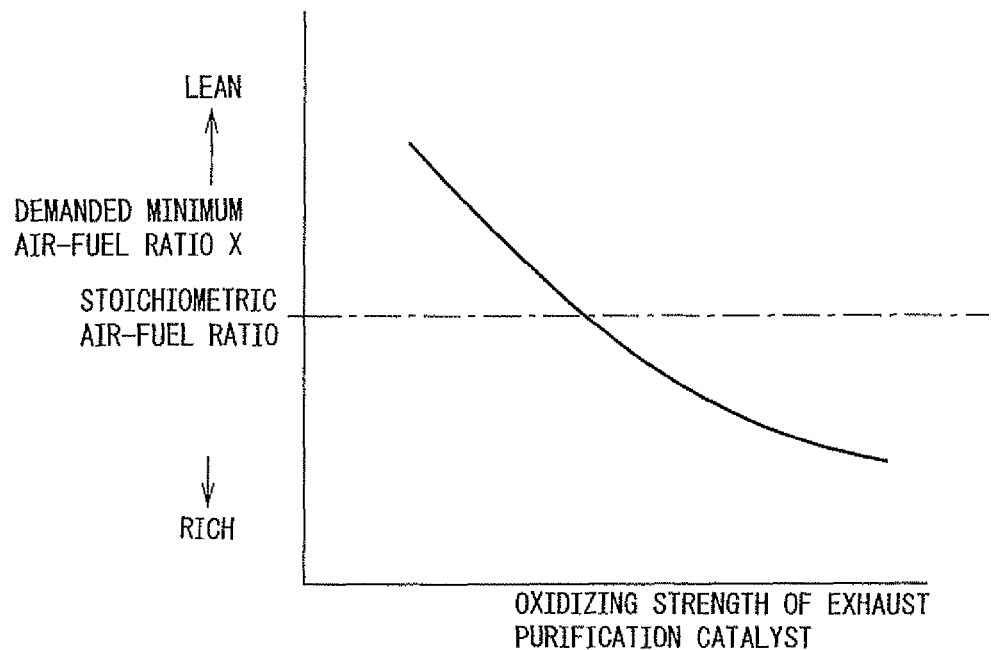
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
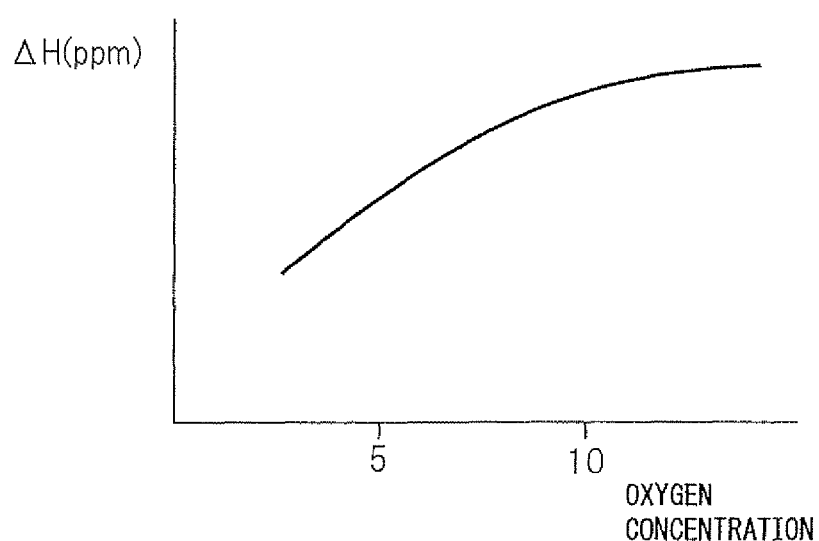
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
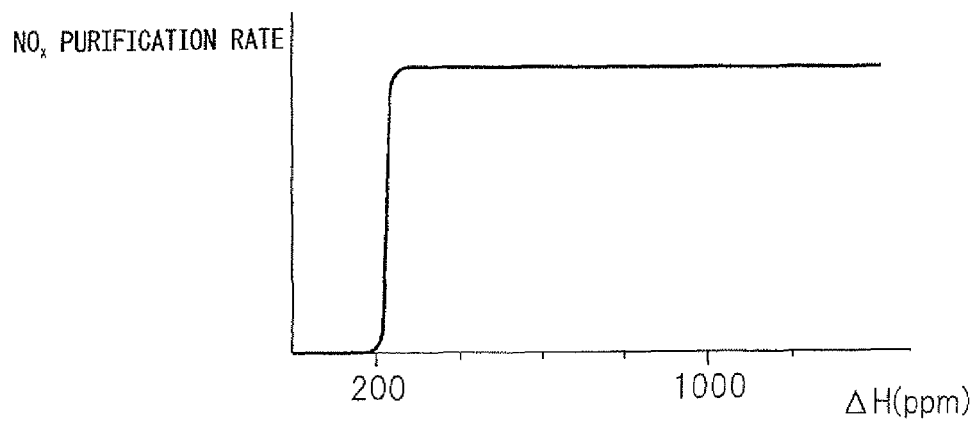
FIG. 14 is a view showing a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
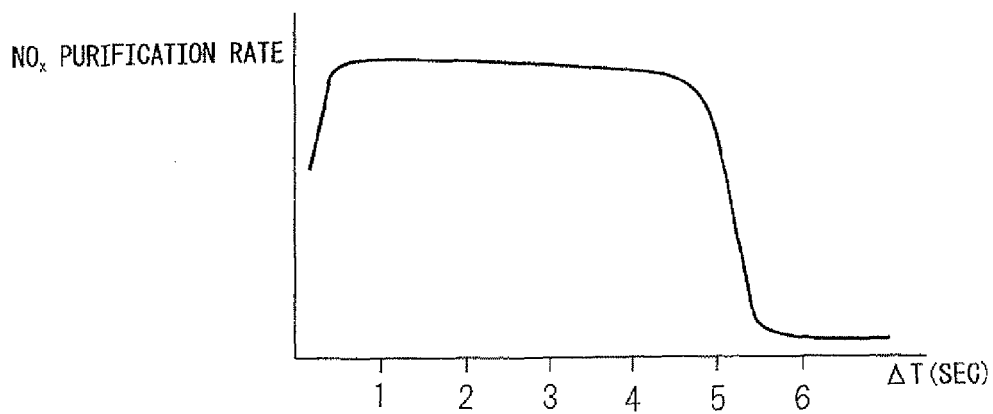
FIG. 15 is a view showing a relationship of a vibration period $\Delta T$ of a hydrocarbon concentration and an $NO_x$ purification rate.

Further, if the vibration period $\Delta T$ of the hydrocarbon concentration becomes longer, the oxygen concentration around the active $NO_x^*$ becomes higher in the time after the hydrocarbons are fed to when the hydrocarbons are next fed. In this case, if the vibration period $\Delta T$ of the hydrocarbon concentration becomes longer than about 5 seconds, the majority of the active $NO_x^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16A:
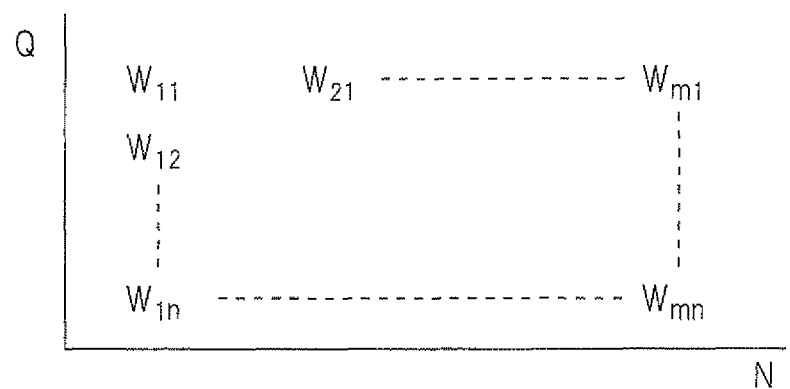
FIGS. 16A and 16B are views showing maps of the hydrocarbon feed amount W etc.
Figure 16B:
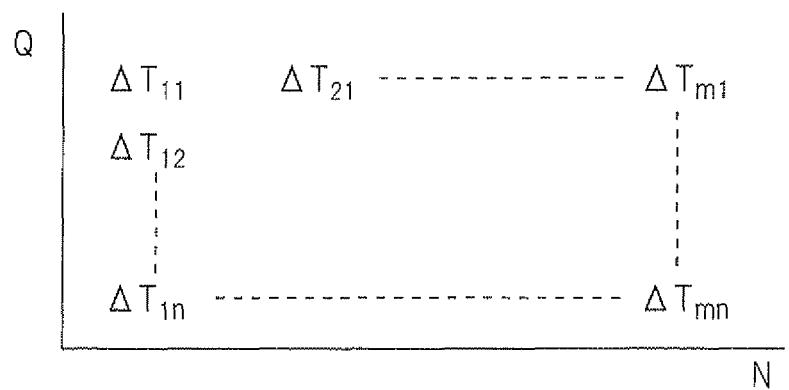

Now, in the present invention, by changing the feed amount and injection timing of hydrocarbons from the hydrocarbon feed valve 17, the amplitude $\Delta H$ and the vibration period $\Delta T$ of the hydrocarbon concentration are controlled to the optimum values in accordance with the operating state of the engine. In this case, in this embodiment of the present invention, the hydrocarbon feed amount W able to give the optimum amplitude $\Delta H$ of the hydrocarbon concentration is stored as a function of the injection amount Q from the fuel injector 3 and engine speed N in the form of a map such as shown in FIG. 16A in advance in the ROM 32. Further, the optimum vibration amplitude $\Delta T$ of the hydrocarbon concentration, that is, the injection period $\Delta T$ of the hydrocarbons, is similarly stored as a function of the injection amount Q and engine speed N in the form of a map such as shown in FIG. 16B in advance in the ROM 32.

Next, referring to FIG. 17A to FIG. 19, an NO purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 17A:
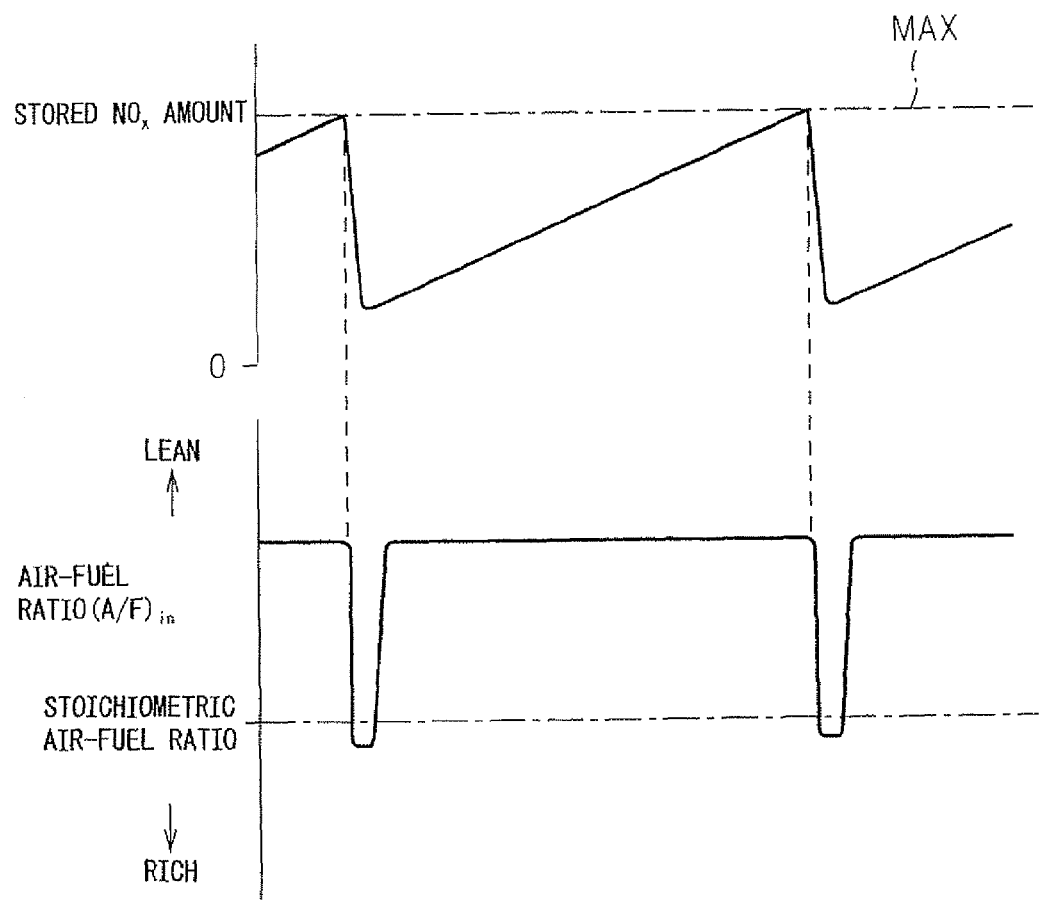
FIGS. 17A and 17B are views showing changes in the air-fuel ratio of the exhaust gas flowing to the exhaust purification catalyst etc.

In this second $NO_x$ purification method, as shown in FIG. 17A, when the stored $NO_x$ amount of $NO_x$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 17B:
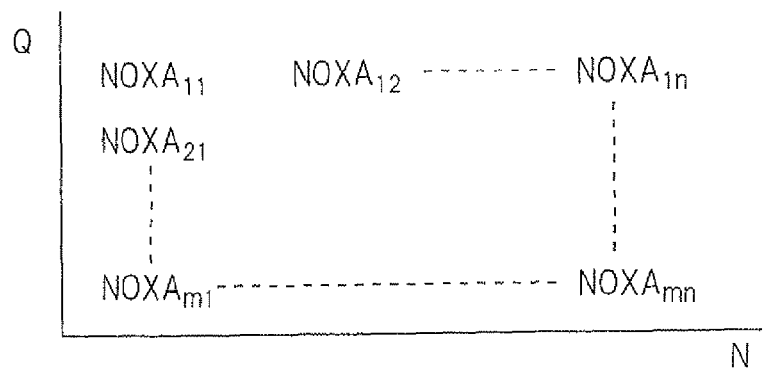

This stored $NO_x$ amount is, for example, calculated from the $NO_x$ amount which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17B in advance in the ROM 32. From this exhausted $NO_x$ amount NOXA, the stored $NO_x$ amount is calculated. In this case, as explained before, the period in which the air-fuel ratio (A/F)in of the exhaust gas is made rich is usually 1 minute or more.

Figure 18:
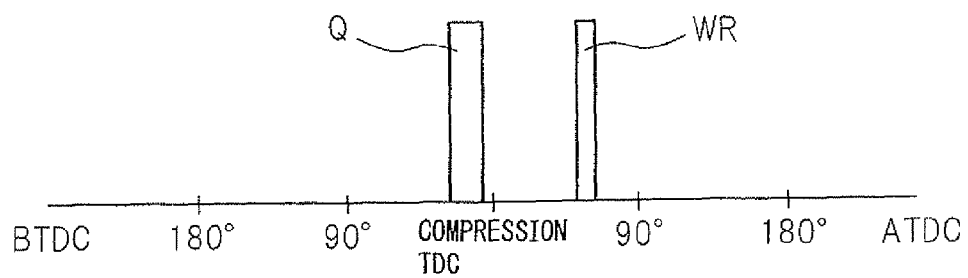
FIG. 18 is a view showing a fuel injection timing.
Figure 19:
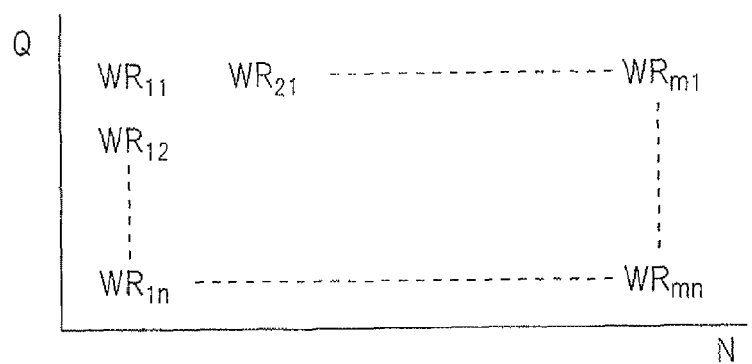
FIG. 19 is a view showing a map of a hydrocarbon feed amount WR.

In this second $NO_x$ purification method, as shown in FIG. 18, the fuel injector 3 injects additional fuel WR into the combustion chamber 2 in addition to the combustion-use fuel Q so that the air-fuel ratio (A/F)in of the exhaust gas flowing into the exhaust purification catalyst 13 is made rich. Note that, in FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 19 in advance in the ROM 32. Of course, in this case, it is also possible to increase the feed amount of hydrocarbons from the hydrocarbon feed valve 17 to make the air-fuel ratio (A/F)in of the exhaust gas rich.

In this regard, to use the first $NO_x$ purification method to remove $NO_x$, even when the $NO_x$ concentration in the exhaust gas is low, at least a certain amount of hydrocarbons has to be fed in a short period. Therefore, when the $NO_x$ concentration of the exhaust gas is low, the $NO_x$ purification efficiency becomes poor. As opposed to this, in the second $NO_x$ purification method, when the $NO_x$ concentration in the exhaust gas is low, the time until the stored $NO_x$ amount reaches the allowable value MAX becomes longer, so the period for making the air-fuel ratio (A/F)in of the exhaust gas rich just becomes longer, and accordingly the $NO_x$ purification efficiency does not particularly become worse. Therefore, when the $NO_x$ concentration in the exhaust gas is low, use of the second $NO_x$ purification method rather than the first $NO_x$ purification method can be said to be preferable. That is, which of the first $NO_x$ purification method and second $NO_x$ purification method should be used changes in the engine operating state.

Now, as explained before, when using the first $NO_x$ purification method for the $NO_x$ purification action, as shown in FIG. 6A, the reducing intermediate R—NCO or R—$NH_2$ reacts with the active $NO_x^*$ to form $N_2$, $CO_2$, and $H_2O$. However, in practice, not all of the reducing intermediate reacts with the active $NO_x^*$ to form $N_2$, $CO_2$, and $H_2O$. Part of the reducing intermediate is exhausted as it is or in the form of a nitrogen-containing intermediate derived from that reducing intermediate from the exhaust purification catalyst 13. In this embodiment according to the present invention, at this time, the main nitrogen-containing intermediate which is exhausted from the exhaust purification catalyst 13 is the hydroxylamine $NH_2OH$.

In this regard, if the nitrogen-containing intermediate which is exhausted from the exhaust purification catalyst 13 changes to $NO_x$ in the gas phase, and if a catalyst which has an oxidation function is arranged downstream of the exhaust purification catalyst 13, the nitrogen-containing intermediate which is exhausted from the exhaust purification catalyst 13 changes to $NO_x$ on this catalyst. Further, even when the reducing intermediate is exhausted as it is from the exhaust purification catalyst 13, this reducing intermediate changes to $NO_x$ in the gas phase or on the catalyst. As a result, the $NO_x$ purification rate ends up falling.

That is, in the exhaust purification system according to the present invention, at the time of engine operation, to reduce the $NO_x$ which is contained in exhaust gas at the exhaust purification catalyst 13, if making the concentration of hydrocarbons flowing into the exhaust purification catalyst 13 vibrate by within the predetermined range of amplitude $\Delta H$ and within the predetermined range of period $\Delta T$, the nitrogen-containing intermediate which is produced at the $NO_x$ reduction process is exhausted from the exhaust purification catalyst 13. Therefore, in the present invention, an intermediate $NO_x$ adsorption catalyst for adsorption of the nitrogen-containing intermediate or $NO_x$ exhausted at this time, as shown in FIG. 1, is provided downstream of the exhaust purification catalyst 13 inside of the engine exhaust passage.

In this intermediate/$NO_x$ adsorption catalyst 15, a metal with a lower oxidizing strength than a precious meal is carried on its catalyst carrier. In this embodiment according to the present invention, the catalyst carrier of the intermediate $NO_x$ adsorption catalyst 15 is comprised of alumina or zeolite, while the metal which is carried on this catalyst carrier is comprised of at least one transition metal selected from silver Ag, copper Cu, iron Fe, vanadium V, molybdenum Mo, cobalt Co, nickel Ni, and manganese Mn.

This intermediate $NO_x$ adsorption catalyst 15 adsorbs the nitrogen-containing intermediate or $NO_x$ when the catalyst temperature is low. The adsorbed nitrogen-containing intermediate or $NO_x$ is made to be desorbed from the intermediate $NO_x$ adsorption catalyst 15 when the catalyst temperature become a 400° C. or so desorption start temperature or more.

In this regard, in the embodiment shown in FIG. 1, the intermediate $NO_x$ adsorption catalyst 15 is arranged under the floor of a vehicle away from the engine body 1. Therefore, the temperature of this intermediate $NO_x$ adsorption catalyst 15 is normally maintained at a low temperature. Therefore, the nitrogen-containing intermediate or $NO_x$ which is exhausted from the exhaust purification catalyst 13 normally is adsorbed at the intermediate $NO_x$ adsorption catalyst 15, therefore the nitrogen-containing intermediate and $NO_x$ are never exhausted into the atmosphere.

However, there is a limit to the adsorption ability of the intermediate $NO_x$ adsorption catalyst 15. Therefore, before the adsorption ability of the intermediate $NO_x$ adsorption catalyst 15 reaches that limit, it is necessary to make the adsorbed nitrogen-containing intermediate or $NO_x$ be desorbed from the intermediate $NO_x$ adsorption catalyst 15. In this case, if making the temperature of the intermediate $NO_x$ adsorption catalyst 15 rise, the nitrogen-containing intermediate or $NO_x$ can be made to desorb from the intermediate $NO_x$ adsorption catalyst 15.

On the other hand, the majority of the hydrocarbons which are fed from the hydrocarbon feed valve 17 is used for consuming the oxygen in the exhaust gas. That is, the majority of the hydrocarbons which are fed from the hydrocarbon feed valve 17 is oxidized at the exhaust purification catalyst 13. Therefore, the heat of oxidation reaction of the hydrocarbons is used to make the exhaust gas temperature rise, while this rising action of the exhaust gas temperature is used to make the temperature of the intermediate $NO_x$ adsorption catalyst 15 rise.

In this way, if hydrocarbons are fed from the hydrocarbon feed valve 17, the temperature of the intermediate $NO_x$ adsorption catalyst 15 rises. That is, by feeding hydrocarbons from the hydrocarbon feed valve 17, it is possible to make the intermediate $NO_x$ adsorption catalyst 15 rise in temperature. In this case, at this time, it is preferable to use the fed hydrocarbons to remove the $NO_x$ which is contained in exhaust gas in the exhaust purification catalyst 13.

Therefore, in the present invention, when making the nitrogen-containing intermediate or $NO_x$ which is adsorbed at the intermediate/$NO_x$ adsorption catalyst 15 desorb, the temperature of the intermediate/$NO_x$ adsorption catalyst 15 is raised by the heat of oxidation reaction of the hydrocarbons while vibrating the concentration of hydrocarbons flowing into the exhaust purification catalyst 13 by within the predetermined range of amplitude and within the predetermined range of period.

Figure 21:
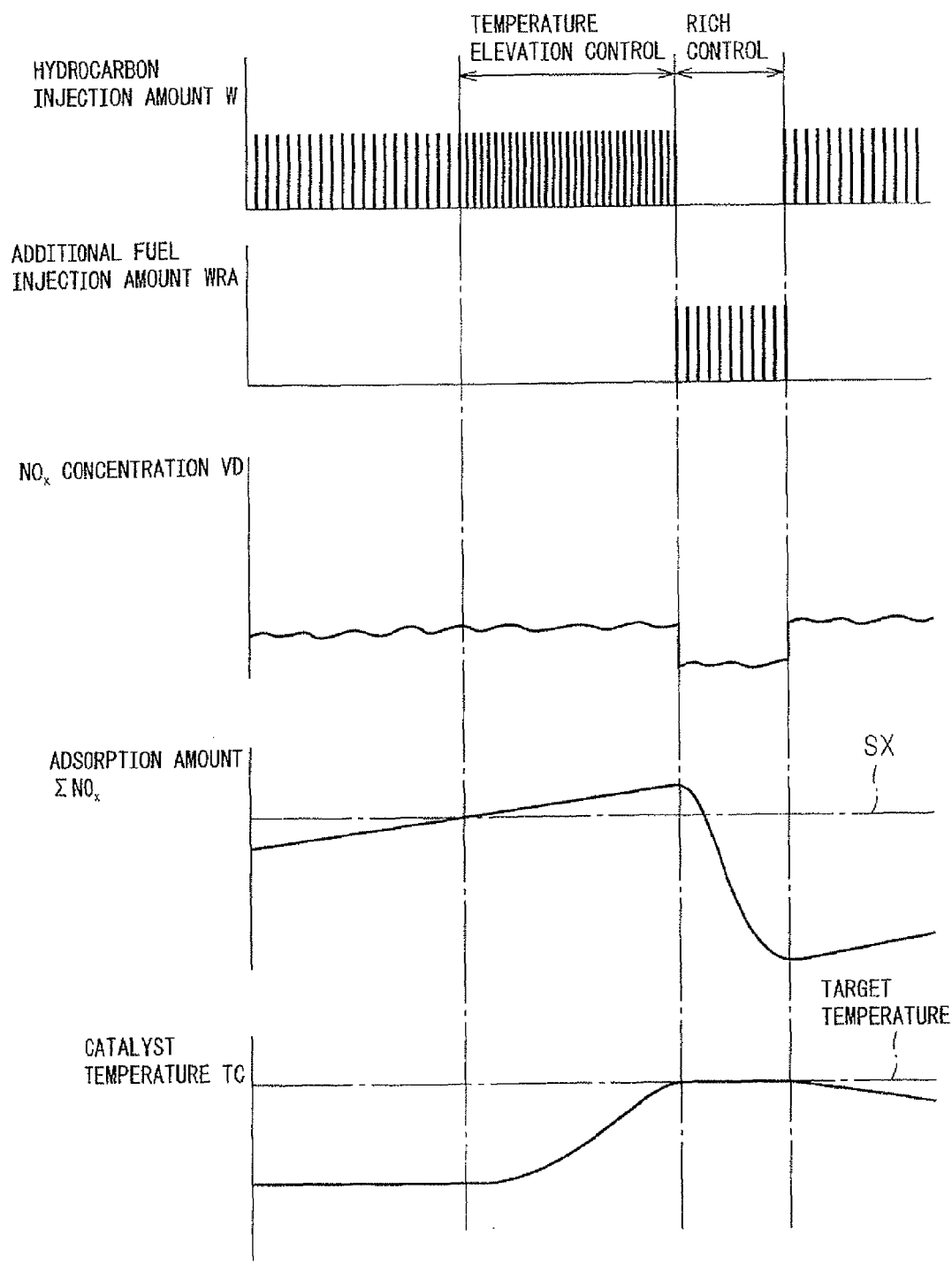
FIG. 21 is a time chart for explaining $NO_x$ purification processing.

Next, the $NO_x$ purification processing as a whole will be explained while referring to FIG. 21 showing an embodiment of the temperature elevation control of this intermediate $NO_x$ adsorption catalyst 15. This FIG. 21 shows the hydrocarbon feed amount W from the hydrocarbon feed valve 17, the injection amount WRA of additional fuel from the fuel injector 3, the change in the $NO_x$ concentration VD showing the concentration of nitrogen-containing intermediate and $NO_x$ exhausted from the exhaust purification catalyst 13, the change in the adsorption amount $\Sigma NOX$ of the nitrogen-containing intermediate and $NO_x$ which are adsorbed at the intermediate $NO_x$ adsorption catalyst 15, and the change of the catalyst temperature TC of the intermediate $NO_x$ adsorption catalyst 15. Note that, this FIG. 21 shows the case where the first $NO_x$ purification method is used to perform the $NO_x$ purification action.

Now, the nitrogen-containing intermediate which is exhausted from the exhaust purification catalyst 13 is detected as $NO_x$ by the $NO_x$ concentration sensor 25. Therefore, the $NO_x$ concentration VD in FIG. 21 shows the $NO_x$ concentration which was detected by this $NO_x$ concentration sensor 25. The product VD·GA of this $NO_x$ concentration VD and amount of exhaust gas per unit time, that is, the amount of intake air GA per unit time expresses the amount of the nitrogen-containing intermediate and $NO_x$ which are exhausted from the exhaust purification catalyst 13 per unit time. The adsorption amount $\Sigma NOX$ of nitrogen-containing intermediate and $NO_x$ to the intermediate/$NO_x$ adsorption catalyst 15 show in FIG. 21 is calculated by cumulatively adding this amount VD·GA.

On the other hand, in the $NO_x$ adsorption amount $\Sigma NOX$ of FIG. 21, SX indicates the allowable $NO_x$ adsorption amount. In the catalyst temperature TC of FIG. 21, the target temperature shows the target temperature of temperature rise of the intermediate $NO_x$ adsorption catalyst 15 which is slightly higher than the 400° C. or so desorption start temperature. As shown in FIG. 21, when the catalyst temperature TC is low, the adsorption amount $\Sigma NOX$ increases along with the elapse of time. Before the adsorption amount $\Sigma NOX$ reaches the allowable $NO_x$ adsorption amount SX, the $NO_x$ purification action by the first $NO_x$ purification method is performed.

On the other hand, if the adsorption amount $\Sigma NOX$ exceeds the allowable $NO_x$ adsorption amount SX, the temperature elevation control of the intermediate $NO_x$ adsorption catalyst 15 is started. At this time, the temperature elevation control is performed by increasing the amount of feed of hydrocarbons from the hydrocarbon feed valve 17. If the temperature elevation control is started, the catalyst temperature TC gradually rises.

Figure 20:
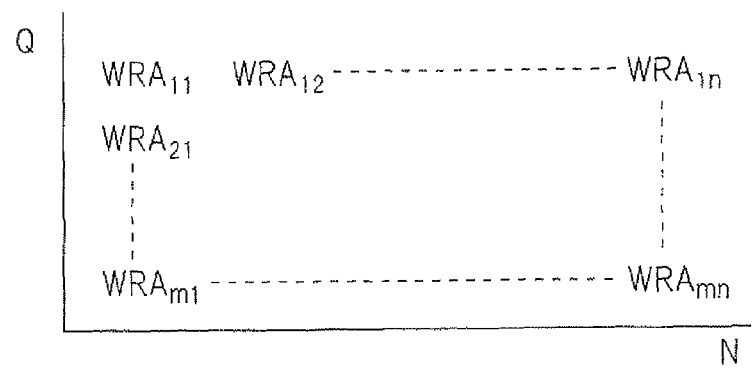
FIG. 20 is a view showing a map of a hydrocarbon feed amount WRA.

Next, when the catalyst temperature TC is made to rise to the target temperature, to reduce the nitrogen-containing intermediate and $NO_x$ which are desorbed from the intermediate $NO_x$ adsorption catalyst 15 in the reduction catalyst 16, the rich control which makes the air-fuel ratio of the exhaust gas flowing into the exhaust purification catalyst 13 rich is performed. In the example shown in FIG. 21, this rich control is performed by injection of additional fuel WRA from the fuel injector 3 to the combustion chamber 2. This injection amount WRA is stored as a function of the injection amount Q from the fuel injector 3 and engine speed N in the form of a map shown in FIG. 20 in advance in the ROM 32.

This rich control is, for example, continued for about 10 seconds. At this time, the $NO_x$ which is exhausted from the engine is reduced at the exhaust purification catalyst 13 or reduction catalyst 16, so the $NO_x$ purification action by the feed of hydrocarbons from the hydrocarbon feed valve 17 is stopped. When the rich control is ended, the $NO_x$ purification action by the first $NO_x$ purification method is again started.

Next, referring to FIGS. 22A, 22B, 23A, and 23B showing the changes in the injection amount of hydrocarbons W from the hydrocarbon feed valve 17 and the air-fuel ratio (A/F)in of the exhaust gas which flows into the exhaust purification catalyst 13, the temperature elevation control shown in FIG. 21 will be explained in a bit more detail. Note that these FIGS. 22A, 22B, 23A, and 23B show the injection amount W and the air-fuel ratio (A/F)in in the same engine operating state.

Figure 22A:
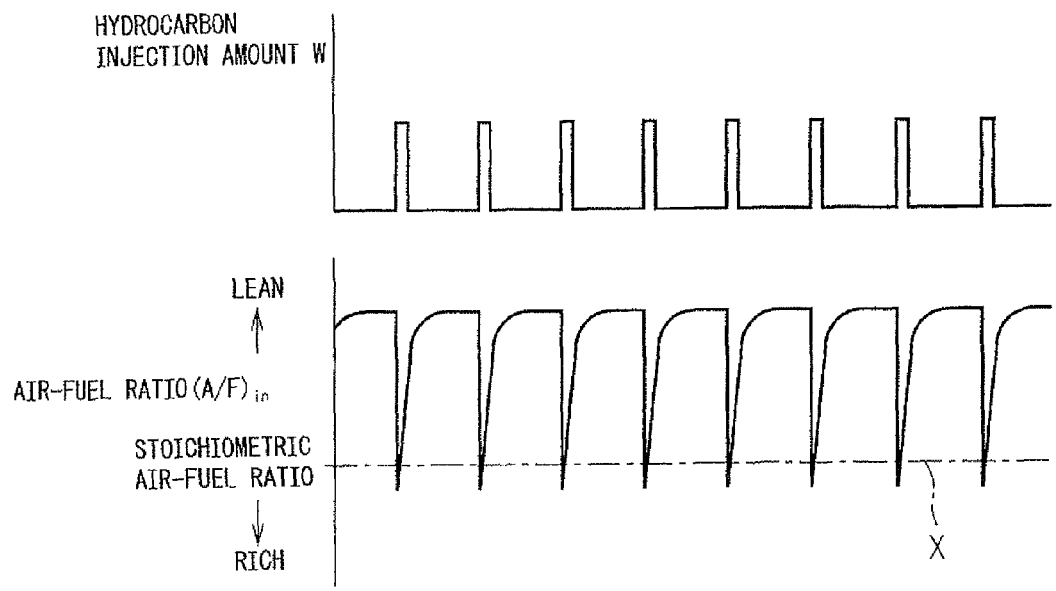
FIGS. 22A and 22B are views showing a hydrocarbon injection amount W and an air-fuel ratio (A/F)in of the exhaust gas.
Figure 22B:
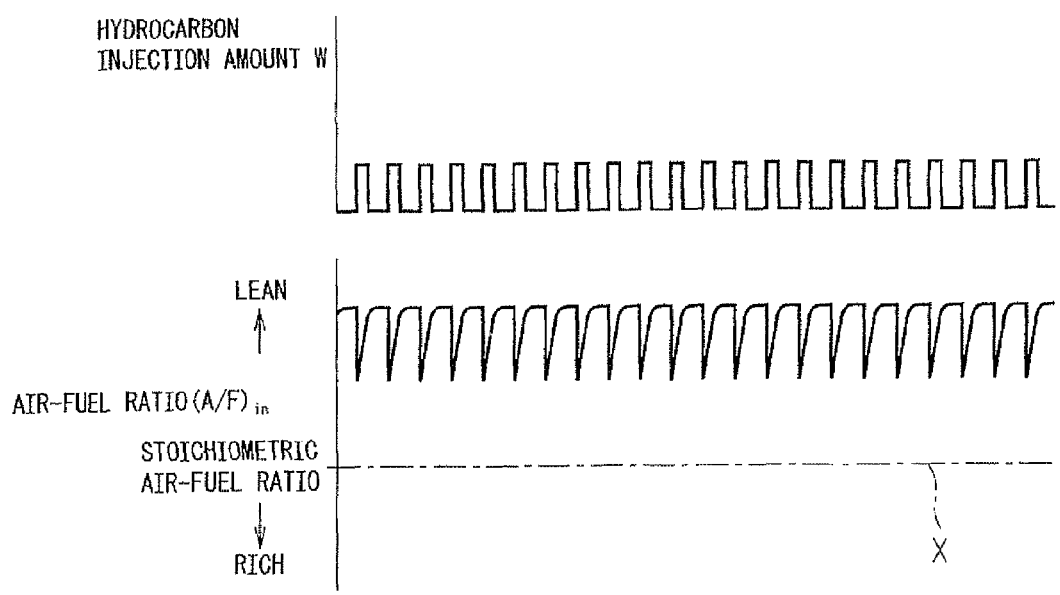

FIG. 22A shows the changes in the hydrocarbon injection amount W and the air-fuel ratio (A/F)in when the first $NO_x$ purification action is being used for the $NO_x$ purification action. On the other hand, FIG. 22B shows the changes in the hydrocarbon injection amount W and the air-fuel ratio (A/F) in when not considering $NO_x$ removal and considering only temperature elevation. Here, the method of calculation of the feed amount of hydrocarbons required for temperature elevation will be explained.

That is, the feed amount WQ of hydrocarbons per unit time required for making the catalyst temperature TC rise to the target temperature is expressed by the following formula where "C" is a constant.

$$WQ = C \cdot (\text{target temperature} - \text{exhaust gas temperature}) \cdot \text{exhaust gas flow rate}$$

That is, the amount of heat generated by the oxidation reaction of the hydrocarbons is proportional to the feed amount WQ of hydrocarbons per unit time. The amount of heat generated required for making the exhaust gas temperature rise to the target temperature is proportional to the temperature difference between the target temperature and the current exhaust gas temperature and is proportional to the amount of flow of the exhaust gas. Therefore, the feed amount WQ of hydrocarbons per unit time required for making the catalyst temperature TC rise to the target temperature is expressed by the above formula.

In this case, as the amount of flow of the exhaust gas, it is possible to use the intake air amount GA detected by the intake air amount detector 8. The exhaust gas temperature can be detected by the temperature sensor 26. Therefore, the feed amount WQ of hydrocarbons per unit time can be calculated from the output value of the intake air amount detector 8 and the output value of the temperature sensor 26. In this case, there are innumerable combinations of the injection amount W and the injection period which satisfy the calculated feed amount WQ of hydrocarbons per unit time.

FIG. 22B shows the case of reducing the injection amount W and shortening the injection period while satisfying this calculated feed amount WQ. In this case, the air-fuel ratio (A/F)in of the exhaust gas does not fall to the demanded minimum air-fuel ratio X, therefore, the catalyst temperature TC can be made to rise to the target temperature, but no $NO_x$ purification action is performed at the exhaust purification catalyst 13. However, in this case, it is preferable to determine the injection amount W and the injection period so that the $NO_x$ purification action by the first $NO_x$ purification method is performed.

Therefore, in this embodiment according to the present invention, when the intermediate $NO_x$ adsorption catalyst 15 is made to rise in temperature, the injection amount W and the injection period are determined based on the calculated feed amount WQ of hydrocarbons per unit time so that the catalyst temperature TC is risen to the target temperature while performing the $NO_x$ purification action by the first $NO_x$ purification method. The changes in the injection amount W and the air-fuel ratio (A/F)in at this time are shown in FIG. 23A.

Regarding this, in other words, in this embodiment according to the present invention, the amplitude and vibration period of the hydrocarbon concentration when making the intermediate $NO_x$ adsorption catalyst 15 rise in temperature are determined based on the feed amount WQ of hydrocarbons per unit time calculated within the above predetermined range where the first $NO_x$ purification method can be performed. Expressing this a bit more comprehensively, in this embodiment according to the present invention, the amplitude and vibration period of the hydrocarbon concentration when making the intermediate $NO_x$ adsorption catalyst 15 rise in temperature are determined within the above-mentioned predetermined range based on the amount of hydrocarbons necessary for making the temperature TC of the intermediate $NO_x$ adsorption catalyst 15 rise to the target temperature.

Figure 23A:
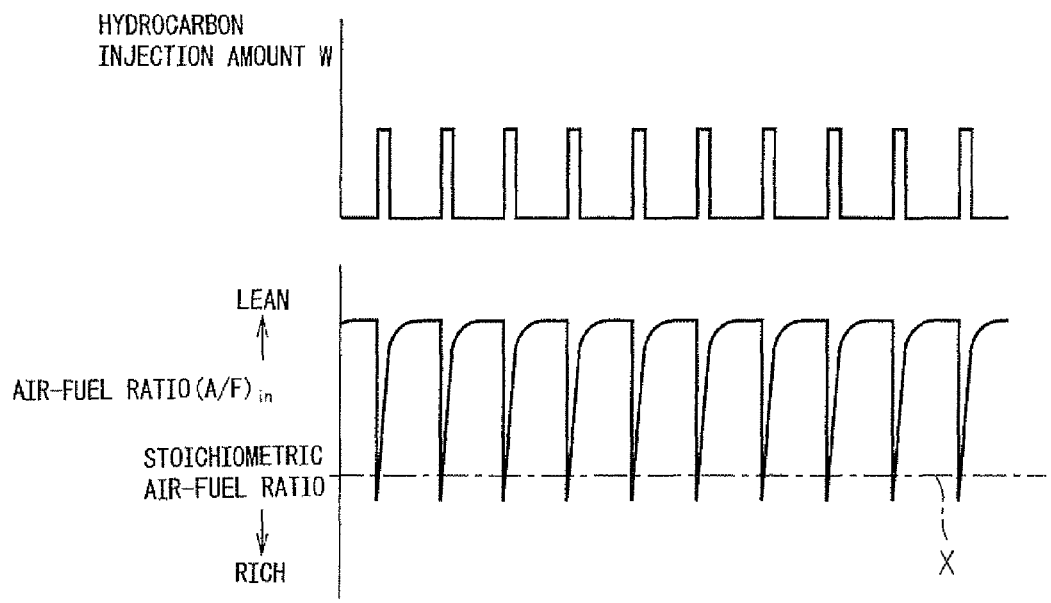
FIGS. 23A and 23B are views showing a hydrocarbon injection amount W and air-fuel ratio (A/F)in of the exhaust gas.

In the embodiment shown in FIG. 23A, the injection amount W is made the same as the injection amount W in the case shown in FIG. 22A, that is, when the first $NO_x$ purification method is being used for the $NO_x$ purification action, and the injection period is made shorter than the case shown in FIG. 22A.

On the other hand, for example, if, in the state where the second $NO_x$ purification method is being performed and a large amount of $NO_x$ is stored in the basic layer 53, the second $NO_x$ purification method is switched to, at this time, the $NO_x$ purification rate by the exhaust purification catalyst 13 will greatly fall.

Figure 23B:
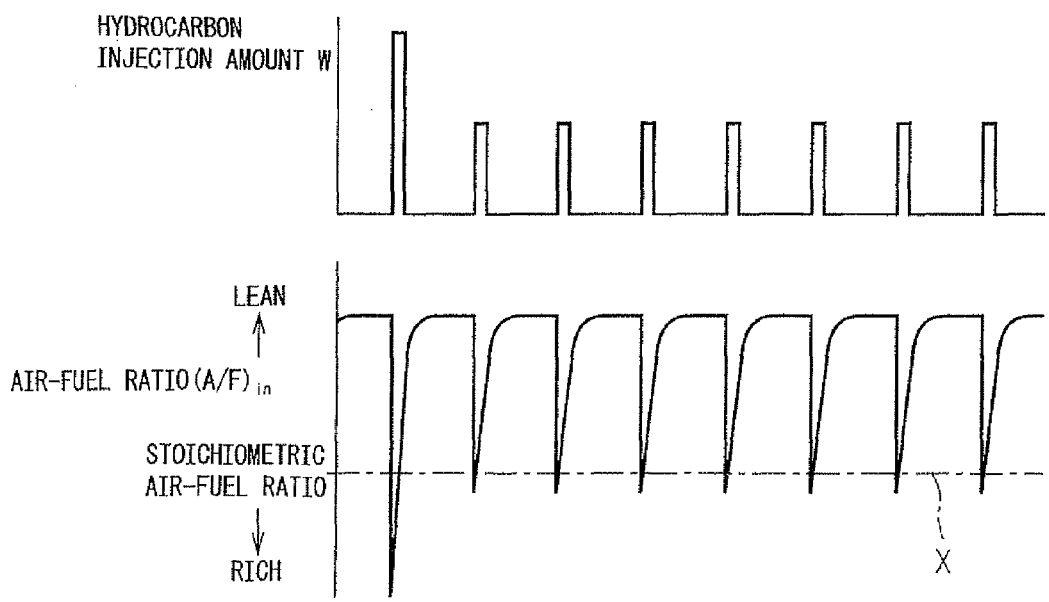

Therefore, in this embodiment according to the present invention, when the $NO_x$ purification rate RD by the exhaust purification catalyst 13 falls to a predetermined allowable purification rate RX or less, as shown in FIG. 23B, the air-fuel ratio (A/F)in of the exhaust gas flowing into the exhaust purification catalyst 13 is made temporarily very rich to release the $NO_x$ which is stored in the exhaust purification catalyst 13. Due to this, in the subsequently performed $NO_x$ purification action by the first $NO_x$ purification method, a good $NO_x$ purification rate is secured. Note that, in this case, it is possible to inject additional fuel WR into the combustion chamber 3 to make the air-fuel ratio (A/F)in of the exhaust gas temporarily rich.

Note that, the $NO_x$ purification rate RD can be found from the $NO_x$ amount which flows into the exhaust purification catalyst 13 per unit time and the $NO_x$ amount which is exhausted from the exhaust purification catalyst 13 per unit time. In this case, for the $NO_x$ amount which flows into the exhaust purification catalyst 13 per unit time, the value NOXA of the map shown in FIG. 17B can be used. The $NO_x$ amount which is exhausted from the exhaust purification catalyst 13 per unit time, as explained before, can be found from the product VD·GA of the $NO_x$ concentration VD detected by the $NO_x$ concentration sensor 25 and the intake air amount GA. Therefore, from these values NOXA and VD·GA, the $NO_x$ purification rate RD (=(NOXA−VD·GA)/NOXA)

Next, referring to FIG. 24, the $NO_x$ purification control routine will be explained. Note that, the routine shown in FIG. 24 is executed by interruption every constant time.

Figure 24:
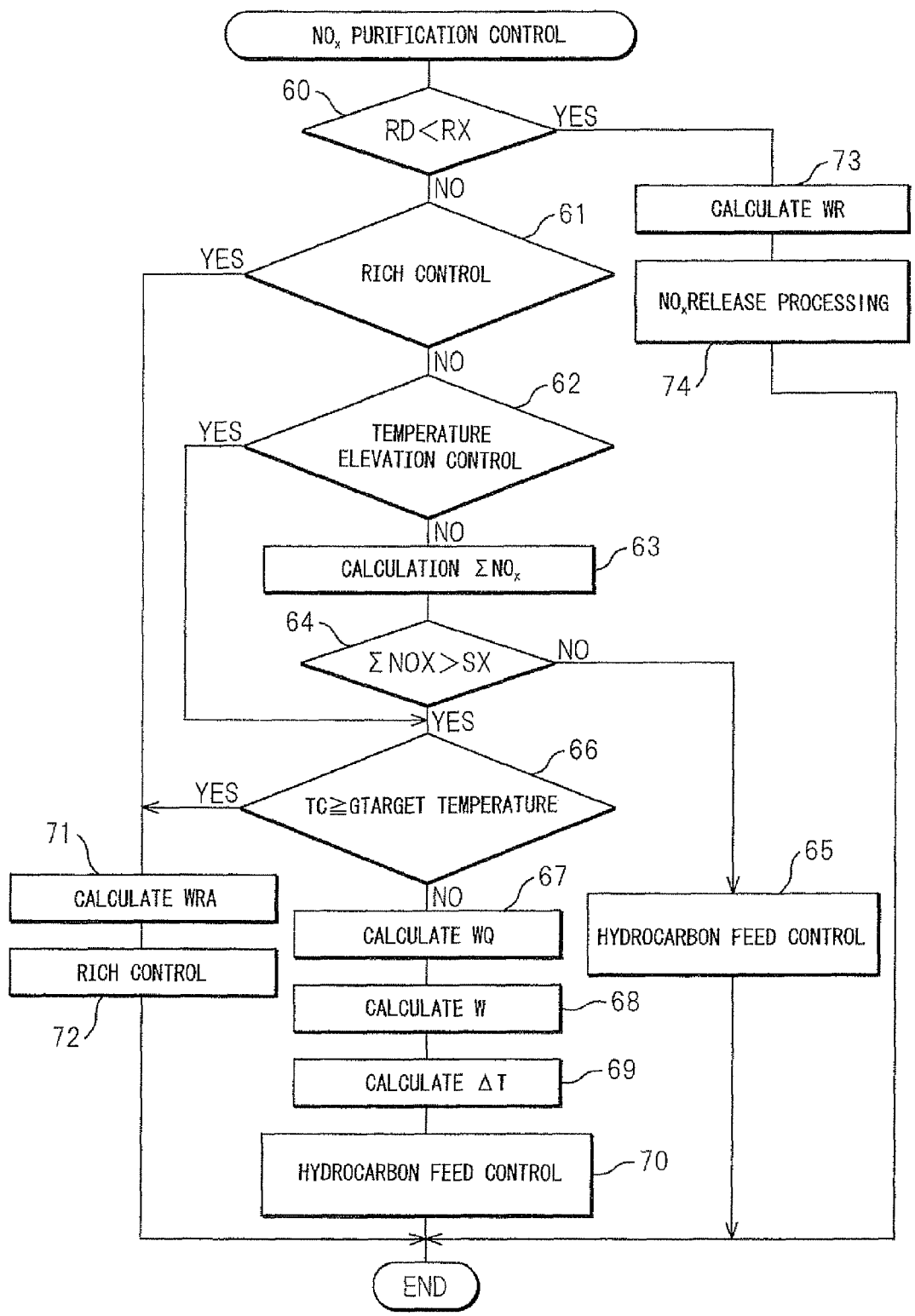
FIG. 24 is a flow chart for $NO_x$ purification control.

Referring to FIG. 24, first, it is judged if the NO purification rate RD (=NOXA−VD·GA)/NOXA) by the exhaust purification catalyst 13 is lower than a predetermined allowable purification rate RX. When the $NO_x$ purification rate RD is higher than the allowable purification rate RX, the routine proceeds to step 61 where it is judged if rich control in temperature elevation control is being performed. If rich control is not being performed, the routine proceeds to step 62 where it is judged if temperature elevation control is being performed. When temperature elevation control is not being performed, the routine proceeds to step 63 where, from the $NO_x$ concentration VD detected by the $NO_x$ concentration sensor 25 and the intake air amount GA, the $NO_x$ adsorption amount ΣNOX to the intermediate $NO_x$ adsorption catalyst 15 is calculated based on the following formula.

$$\Sigma NOX \leftarrow \Sigma NOX + VD \cdot GA$$

Next, at step 64, it is judged if the $NO_x$ adsorption amount ΣNOX exceeds the allowable $NO_x$ adsorption amount SX. When ΣNOX≤SX, the routine proceeds to step 65 where the injection amount W and the injection period ΔT are calculated from the maps shown in FIG. 16A and FIG. 16B. Based on these, hydrocarbons are injected from the hydrocarbon feed valve 17. At this time, $NO_x$ purification processing by the first $NO_x$ purification method is performed.

As opposed to this, when it is judged at step 64 that ΣNOX>SX, the routine proceeds to step 66 where temperature elevation control is started. When temperature elevation control is started, at the next processing cycle, the routine jumps from step 62 to step 66. At step 66, it is judged if the temperature TC of the intermediate $NO_x$ adsorption catalyst 15 exceeds the target temperature. When TC<target temperature, the routine proceeds to step 67 where the following formula is used as the basis to calculate the feed amount WQ of hydrocarbons per unit time required for making the catalyst temperature TO rise to the target temperature.

$$WQ = C \cdot (\text{target temperature} - \text{exhaust gas temperature}) \cdot \text{exhaust gas flow rate}$$

Next, at step 68, the injection amount W is calculated from the map shown in FIG. 16A. Next, at step 69, this injection amount W is used as the basis to calculate the injection period ΔT satisfying the feed amount WG of hydrocarbons per unit time. Next, at step 70, hydrocarbons are fed from the hydrocarbon feed valve 17 by the injection amount W and injection timing ΔT. At this time, the temperature TC of the intermediate $NO_x$ adsorption catalyst 15 is raised while performing the $NO_x$ purification action by the first $NO_x$ purification method.

Next, when it is judged at step 66 that TC≥target temperature, the routine proceeds to step 71 where rich control is started. When rich control is started, at the next processing cycle, the routine jumps from step 61 to step 71. At step 71, the additional fuel amount WRA is calculated from the map shown in FIG. 20, next, at step 72, additional fuel is injected from the fuel injector 3 by the fuel amount WRA over a predetermined time period.

On the other hand, when it is judged at step 60 that the $NO_x$ purification rate RD falls below the allowable purification rate RX, the routine proceeds to step 73 where the additional fuel amount WR is calculated from the map shown in FIG. 19. Next, at step 74, additional fuel is injected from a fuel injector 3 by the fuel amount WR. Of course, in this case, instead of injecting additional fuel from the fuel injector 3, it is also possible to inject hydrocarbons from the hydrocarbon feed valve 17 to make the air-fuel ratio (A/F) in of the exhaust gas flowing into the exhaust purification catalyst 13 rich.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
15 . . . intermediate $NO_x$ adsorption catalyst
17 . . . hydrocarbon feed valve

The invention claimed is:
1. An exhaust purification system of an internal combustion engine, the exhaust purification system comprising:
an engine exhaust passage;
an exhaust purification catalyst for reacting $NO_x$ contained in exhaust gas and reformed hydrocarbons arranged inside of the engine exhaust passage;
a precious metal catalyst carried on an exhaust gas flow surface of the exhaust purification catalyst;
a basic exhaust gas flow surface part formed around the precious metal catalyst;
an intermediate $NO_x$ adsorption catalyst for adsorbing a nitrogen-containing intermediate or $NO_x$ that is produced in a $NO_x$ reduction process and exhausted from the exhaust purification catalyst arranged inside of the engine exhaust passage downstream of the exhaust purification catalyst; and
an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalyst and held on the basic exhaust gas flow surface part, the $NO_x$ contained in the exhaust gas catalyst is chemically reduced by the reducing intermediate held on the basic exhaust gas flow surface part in the exhaust purification catalyst, the nitrogen-containing intermediate is derived from the reducing intermediate, and the exhaust purification catalyst has a property of chemically reducing the $NO_x$ that is contained in the exhaust gas without stor- ing, or storing a fine amount of nitrates in the exhaust gas in the basic exhaust gas flow surface part, when the electronic control unit controls the vibration period of the hydrocarbon concentration longer than the predetermined range of period, the exhaust purification catalyst has a property of being increased in a storage amount of $NO_x$ that is contained in the exhaust gas, and the electronic control unit is further configured to cause a desorbing of the nitrogen-containing intermediate or $NO_x$ that is adsorbed at the intermediate $NO_x$ adsorption catalyst by causing a temperature of the intermediate $NO_x$ adsorption catalyst to rise using a heat of an oxidation reaction of the hydrocarbons while vibrating the concentration of hydrocarbons flowing into the exhaust purification catalyst within the predetermined range of amplitude and within the predetermined range of period.

2. The exhaust purification system of an internal combustion engine as claimed in claim 1, wherein the electronic control unit is further configured to determine, based on an amount of hydrocarbons required for causing the temperature of the intermediate $NO_x$ adsorption catalyst rise to to a target temperature, the amplitude and the vibration period of the hydrocarbon concentration when causing the temperature of the intermediate $NO_x$ adsorption catalyst to rise in temperature within the predetermined range of period and amplitude.

3. The exhaust purification system of an internal combustion engine as claimed in claim 2, wherein the electronic control unit is further configured to calculate an amount of hydrocarbons fed per unit time required for causing the temperature of the intermediate $NO_x$ adsorption catalyst to rise to the target temperature, and is further configured to determine, based on a calculated amount of hydrocarbons fed per unit time, the amplitude and the vibration period of the hydrocarbon concentration when causing the temperature of the intermediate $NO_x$ adsorption catalyst to rise within the predetermined range of period and amplitude.

4. The exhaust purification system of an internal combustion engine as claimed in claim 1, further comprising:

a reduction catalyst arranged inside of the engine exhaust passage downstream of the intermediate $NO_x$ adsorption catalyst, wherein when the electronic control unit has caused the temperature of the intermediate $NO_x$ adsorption catalyst to rise to the target temperature, the electronic control unit is further configured to cause an air-fuel ratio of the exhaust gas flowing into the exhaust purification catalyst to be made rich to reduce a desorbing nitrogen-containing intermediate or $NO_x$.

5. The exhaust purification system of an internal combustion engine as claimed in claim 1, wherein when a $NO_x$ purification rate of the exhaust purification catalyst falls to a predetermined allowable purification rate or less, the electronic control unit is further configured to temporarily cause an air-fuel ratio of the exhaust gas flowing into the exhaust purification catalyst to be made rich to release $NO_x$ stored in the exhaust purification catalyst.

6. The exhaust purification system of an internal combustion engine as claimed in claim 1, wherein a metal with a lower oxidizing strength than a precious metal is carried on a catalyst carrier of the intermediate $NO_x$ adsorption catalyst.

7. The exhaust purification system of an internal combustion engine as claimed in claim 6, wherein the metal that is carried on the catalyst carrier of the intermediate $NO_x$ adsorption catalyst is at least one transition metal selected from silver (Ag), copper (Cu), iron (Fe), vanadium (V), molybdenum (Mo), cobalt (Co), nickel (Ni), and/or manganese (Mn).

8. The exhaust purification system of an internal combustion engine as claimed in claim 1, wherein the vibration period of the hydrocarbon concentration is a vibration period necessary for continued production of the reducing intermediate.

9. The exhaust purification system of an internal combustion engine as claimed in claim 8, wherein the vibration period of the hydrocarbon concentration is 0.3 second to 5 seconds.

10. The exhaust purification system of an internal combustion engine as claimed in claim 1, wherein the precious metal catalyst is comprised of platinum (Pt) and at least one of rhodium (Rh) and/or palladium (Pd).

11. The exhaust purification system of an internal combustion engine as claimed in claim 1, wherein a basic layer containing an alkali metal, an alkali earth metal, a rare earth, or a metal that can donate electrons to $NO_x$ is formed on the exhaust gas flow surface of the exhaust purification catalyst and wherein a surface of the basic layer forms the basic exhaust gas flow surface part.

* * * * *